Aug. 14, 1962     L. L. SIFFORD     3,049,413
POLYMERIZATION APPARATUS

Filed Jan. 16, 1958     3 Sheets-Sheet 1

INVENTOR.
LUTHER L. SIFFORD
BY
*Arthur J. Plantamura*
ATTORNEY

Aug. 14, 1962    L. L. SIFFORD    3,049,413
POLYMERIZATION APPARATUS
Filed Jan. 16, 1958    3 Sheets-Sheet 2

INVENTOR.
LUTHER L. SIFFORD
BY
Arthur J. Plantamura
ATTORNEY

Aug. 14, 1962 L. L. SIFFORD 3,049,413
POLYMERIZATION APPARATUS
Filed Jan. 16, 1958 3 Sheets-Sheet 3

INVENTOR.
LUTHER L. SIFFORD
BY
*Arthur J. Plantamura*
ATTORNEY

United States Patent Office 3,049,413
Patented Aug. 14, 1962

3,049,413
POLYMERIZATION APPARATUS
Luther L. Sifford, Hamden, Conn., assignor to American Cyanamid Company, New York, N.Y., a corporation of Maine
Filed Jan. 16, 1958, Ser. No. 709,387
5 Claims. (Cl. 23—285)

This invention relates to apparatus for conducting polymerization reactions and more particularly to a reaction vessel for continuous polymerization systems which provides excellent mixing and temperature control of polymerizing masses during the manufacture of polymers.

During the polymerization of various vinyl type monomers, it is important in order to obtain a good product that accurate control of the temperature and rate of reaction be attained. This control over temperature, for example in preparing styrene-type polymers, is especially important in order that a commercially attractive polymer be produced. Since the polymerization is an exothermic reaction, it is necessary to dissipate the heat evolved; otherwise, hot spots frequently develop in the reaction product which are detrimental to the polymer product. Moreover, as the exotherm increases, runaway temperatures are likely to result unless effective control is maintained. These runaway temperatures are to be avoided, not only because of the danger of explosion from the excessively high temperatures, but also because dimers, trimers, and other objectionable low molecular weight polymers are formed. One of the difficulties during the reaction of these monomers on a large scale commercial basis is attributed to the fact that the mix becomes increasingly more viscous as polymerization progresses, so viscous that a point is ultimately reached where even the sturdiest apparatus available has been found ineffective to agitate the mass so that new surfaces throughout the mass are constantly and thoroughly exposed to heat exchange surfaces. The heat exchange equipment heretofore available for the thermal regulation of the charge is inadequate for such purposes. It is necessary in view of the poor heat transfer of these viscous masses, that they be thoroughly agitated and contacted with large areas of heat exchange surface if a suitable product is to be obtained. The apparatus employed must accordingly be rugged and contain large heat exchange surfaces in contact with the reacting polymerizable material in order to effectively control the heat of the reaction. In view of the rapid hardening and adhesive quality of various polymeric materials, it is important that the reactor be vertically disposed and that the agitator of the reactor be so constructed as to substantially simultaneously work the whole area of the vessel.

The present invention meets the requirements of a suitable reactor for commercial scale continuous polymerizations, i.e., reactors capable of controlling polymerization of large masses of the order of up to 200 cubic feet or even more in a single reactor. The reaction more fully described below provides accurate and intimate temperature control throughout the mass, and is sufficiently rugged in structure to effectively and thoroughly mix and process even extremely viscous masses at the more advanced stage of polymerization. The apparatus of the present invention is particularly suitable for the polymerization of styrene-type polymers such as disclosed in the pending application of James A. Melchore, Serial No. 575,164, filed March 30, 1956, now Patent No. 2,931,793, e.g. styrene per se, nuclear substituted alkyl styrenes, such as o-, m-, and p-methylstyrene, 2,4-dimethylstyrene and includes homopolymers thereof as well as copolymers thereof with acrylonitrile of the type described in U.S. Patent 2,745,824. The apparatus of the present invention has been found to provide an unusually high and uniform quality of polymeric material, good control during the reaction and greatly facilitates handling of the viscous mass.

It is an object of the present invention to provide a novel reaction vessel for continuous polymerization systems which is extremely effective in promoting control of the polymerizations reaction and in thoroughly mixing and processing viscous polymers. Other objectives and advantages provided by the invention will become apparent as the more detailed description of the invention proceeds taken in conjunction with the accompanying drawings wherein.

The reactor which forms the essence of the present invention provides its optimum advantage at an advanced but intermediate stage in the polymerization wherein the high viscosity presents considerable difficulty in handling the material as well as in effectively transferring heat from the mass.

A description of the overall polymerization procedure is more fully set forth in the aforementioned pending application, Serial No. 575,164.

Figure 1:
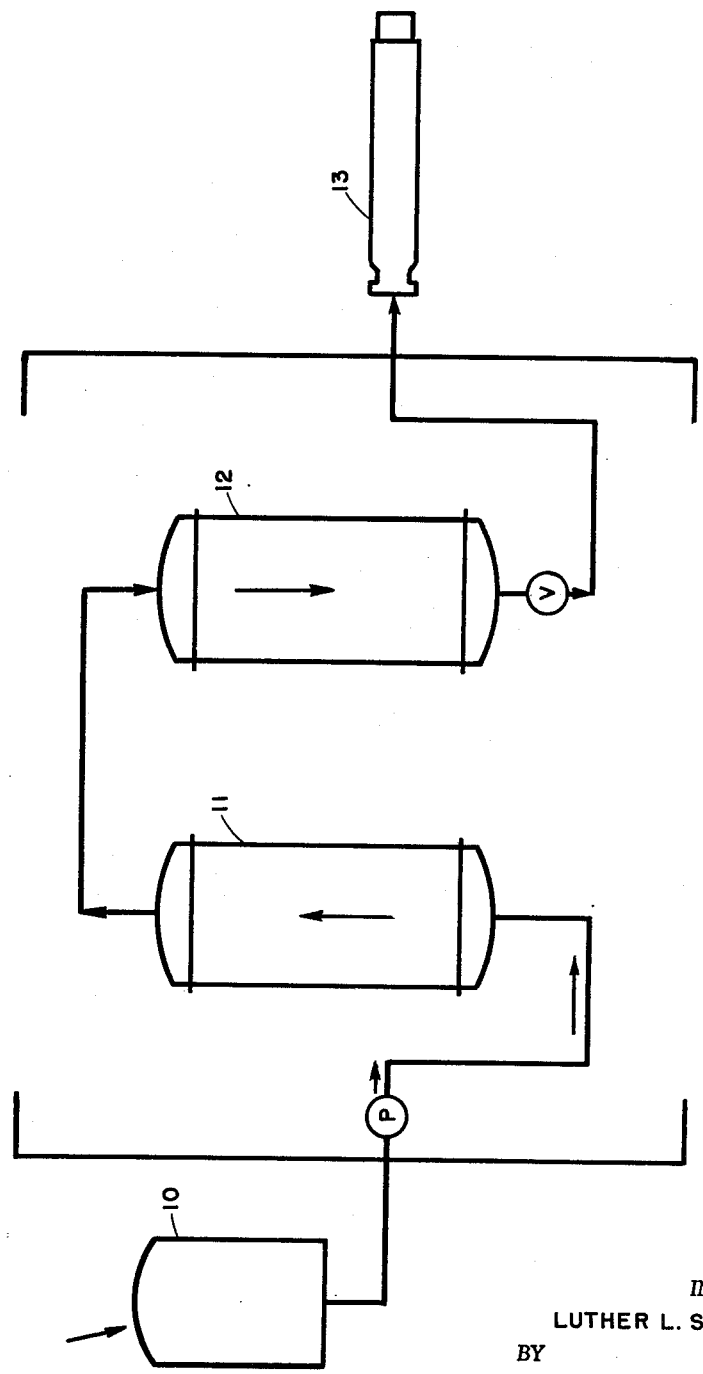
FIG. 1 is a diagrammatic representation of the major steps of the continuous polymerization apparatus with the bracketed portion indicating the part of the system with which the invention is concerned.

By referring to the drawings, the advantages of the apparatus of the present invention in conjunction with the polymerization process wherein it is employed is described as follows. As shown in FIG. 1, the monomeric material to be polymerized is introduced into the prebodied vessel 10 and polymerized to an extent not exceeding about 45% preferably not above about 35%. Thereafter, the partially polymerized mass is pumped into the vertical reactor units 11 and 12. The present invention is directed to these vertical reactor units of which two, 11 and 12, are shown connected in series. As shown in FIG. 1, the material from the prebodied vessel 10 is advanced in polymerization in the reactor 11, leaves the top of this reactor and is introduced into the reactor unit 12 where it is further polymerized. It is apparent that a single vertical reactor may suffice depending on practical considerations which may prevail in the system employed, such as size of the reactor, retention time, and rate of flow, for example. The total conversion of the material from monomer to polymer entering the devolatilizer 13 should not exceed about 75% and preferably not in excess of 70%. In the process employing the instant apparatus, the polymerization of the material is complete when it leaves the vertical reactor zone employing the apparatus of the invention and enters the devolatilizer-extruder 13, i.e. no further polymerization of the material which contains about 70% polymer or less takes place after the vertical reactor zone. In the devolatilizer 13, the partially polymerized mass is worked under heat and vacuum with the effect that the nonpolymerized content and other volatile undesirable constituents are removed producing a polymer substantially 100% pure, i.e. free from both nonpolymerized as well as nonpolymerizable ingredients.

Figures 2, 5:
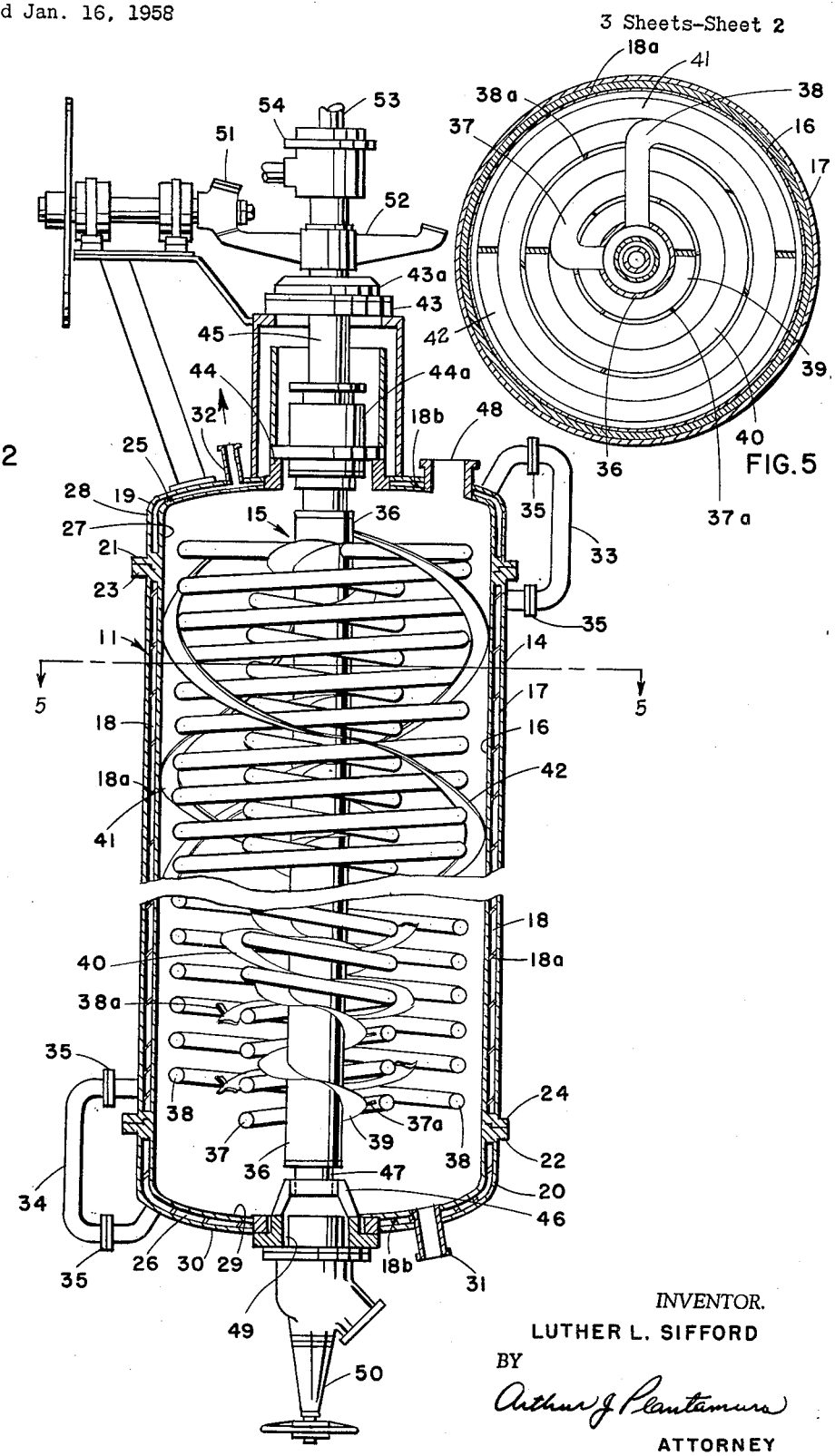
FIG. 2 illustrates the vertical polymerization vessel of the invention with the jacket in section so as to show the agitator-conveyor unit of the reaction vessel which comprises a plurality of hollow coils and mixing ribbons.
FIG. 5 is a horizontal sectional view looking down at the reaction vessel along the line 5—5 of FIG. 2 illustrating the concentric arrangement of coils and mixing ribbons.

The novel features and advantages of the vertical reactor of the present invention will be more fully apparent by reference to FIGS. 2 through 5 of the drawing. FIG. 2 shows the reactor 11 which comprises a casing 14 and an agitator-conveyor 15, the casing 14 having an inner and outer concentrically spaced wall 16 and 17 respectively, forming the interior space 18 in the jacket through which a heat exchange fluid is circulated. Contained within the jacket space 18 is a spiral baffle 18(a) which assures substantially complete circulation of the heat exchange fluid in a spiral upward flight throughout the entire space within the walls. Upper and lower dome-shaped closures 19 and 20 for the cylindrical jacket casing 14 are firmly secured by the flange connections 21 and 22 to the flanges 23 and 24 of the casing 14. The upper and lower dome closure members are also constructed so as to have interior spaces 25 and 26 within the inner and outer walls 27 and 28 of the upper dome 19 and walls 29 and 30 of the lower dome 20, respectively. The spaces 25 and 26 within the dome-shaped closure members also contain baffles 18(b) to assure thorough circulation of the heat exchange fluid. Crossover conduits 33 and 34 containing suitable removable connectors 35 are utilized to permit a continuous circulation of a single stream of heat exchange fluid throughout the jacket as well as the dome-shaped closure members.

Shown at 31 and 32 are the jacket heat exchange fluid inlet and outlet, respectively.

In operation, the heat exchange fluid such as water or steam for example depending on the temperature desired for the stage of polymerization prevailing, enters the inlet 31 and due to the baffles 18(a) and 18(b) traverses a relatively complete and substantially spiral path through the lower dome space, cylindrical jacket space and upper dome space 26, 18 and 25 respectively before being withdrawn through the outlet 32.

Centrally disposed in the casing 14 is a rotatable agitator-conveyor 15 which comprises a plurality of concentrically arranged hollow helicoidal coils (two shown) 37 and 38 and mixing ribbons (four shown) 39, 40, 41 and 42 which will hereinafter be described in greater detail. The central shaft 36 of the rotating coil unit is vertically suspended to facilitate removal thereof from the top of the casing by uncoupling the top flanges 21 and 23. The lower cylindrical bearing 46 for the shaft 36 shown more in detail in FIG. 4, comprises a plurality of struts 46(a), supporting a cylindrical piece 46(b) and in its core in a sliding fit, the bottom of the shaft extension 47. The function of the bearing 46 is essentially to prevent horizontal displacement of the screw conveyor which, as mentioned above, is suspended at the top of the casing. Flow of the polymeric reaction product heated in the vessel passes between struts 46(a) of which there are preferably 3 or more and exits through the passage 49 which leads to the devolatilizer-extruder shown schematically in FIG. 1 when the conventional valve 50 is opened. Substantially the entire weight of the agitator-conveyor screw is supported by the upper bearing arrangements at 43 and 44 shown in FIG. 2. The upper bearing arrangements at 43 and 44 are of conventional design, each comprising a bearing provided with a cylindrical opening to accommodate the upper shaft extension 45, and a horizontal support bearing surface as a fixed part of the jacket casing upon which the weight of the rotating unit 15 is supported. The shaft 36 which carries the coils and mixing ribbons as an integral unit is supported by the pieces 43(a) and 44(a) which are preferably machined as an integral part of the shaft extension 45 or may comprise a cylindrical bushing securely fastened by a keying arrangement (not shown).

Suitable driving means for rotating the agitator-conveyor unit is provided through the pinion and rack gears 51 and 52 respectively. A motor (not shown) may be employed to drive the pinion gear 51. When it is desired to remove the unit 15 from the casing 14, the driving means and upper flange are disconnected and the entire unit is lifted vertically, the bottom of the shaft sliding out of the lower bearing 46 in the upward movement. Referring to FIG. 5, the concentrically arranged ribbons and hollow coils are described in a direction radiating from the central shaft 36. Immediately adjacent to the shaft 36 is attached by weld connection the ribbon 39. Radiating outwardly from the shaft next to the ribbon 39 is preferably a space followed next in line by the first coil 37 to which is attached to the periphery thereof the second ribbon 40. Between the second mixing ribbon 40 and the coil 38 there is again preferably a space followed by the coil 38 and attached thereto two ribbons 41 and 42. Bridging the spaces between the mixing ribbons 39 and coil 37 and between the mixing ribbons 40 and coil 38 are supporting pieces attached by weld connection shown as 37(a) and 38(a) which serve to strengthen the entire integral unit. Mixing ribbons 41 and 42 attached to the outside of coil 38 are spaced from the inner wall 16 of the jacket 14 with a clearance preferably not exceeding about 1.0 inch, the preferred direction of the helicoidal ribbons is such that each subsequent ribbon has a flight reversed to the next preceding one. The outer ribbons 41 and 42 as shown have a reversed direction to one another. The direction of the coils likewise preferably is reversed to the next preceding coil. The pitch of the helicoidal mixing ribbons should be greater than the pitch of the hollow coils. Preferably, the pitch of the inner mixing ribbons 39 and 40 is about twice that of the coils while the outer ribbons preferably have a pitch of about 4 times that of the hollow coils 37 and 38. The action of the ribbons 39, 40, 41 and 42 in conjunction with the action of the coils 37 and 38 on the reacting polymerizable material has the effect of promoting a very thorough mixing of the mass with maximum exposure of the material to the heat exchange surface. The continuous path of flow of heat exchange fluid through the hollow shaft 36 and coils 37 and 38 will be described in connection with FIG. 3 of the drawing. The heat transfer fluid such as water or steam, or other suitable media, enters the central hollow shaft at the inlet 53, passes through a rotary pressure joint 56 by way of a stationary concentric inlet tube 54 located in the upper portion of the shaft 36. The fixed concentric tube 54 is supported at the top 57 in the rotary pressure joint 56 and at the bottom by the annular sealing disc 58 which is positioned below the passages 66 and 67 in the upper extremity of the hollow coils 37 and 38 respectively. The heat exchange fluid passing down the inlet tube 54 is diverted at 59 upon contact with the top of the sealed concentric tube 60 and is forced to flow in the annular space 61 close to the inner walls of the shaft 36. The outside diameter of the tube 60 is thus sufficiently smaller than the inside of the shaft 36 providing an annular space 61 for passage of the heat exchange fluid. The fluid flowing along the inner walls of the shaft 36 affords maximum heat exchange for the polymeric material within the reactor and adjacent to the shaft. The tube 60 is supported within the bottom of the shaft 36 at 62 and at higher points by spot fasteners 63 which do not substantially obstruct fluid flow in the annular space 61. The lower fluid passages 64 and 65 provide access for the fluid into the bottom of the hollow coils 37 and 38 from the annular space 61. The fluid entering the bottom of the inner and outer coils at 64 and 65 respectively is forced upward through the helicoidal interior of the coils and exits at 66 and 67 from the upper extremity of the hollow coils into a second annular space 68 between the outside diameter of the stationary inlet tube 54 and the inside of the upper portion of the shaft extension 45. The fluid flows upward in the annular space 68 isolated from and counter-current to the inlet flow in the tube 54 passes through the rotary pressure joint 56 and exists at the outlet 69.

As has been described, the path of the heat transfer fluid is preferably downward through the stationary tube 54 and annular space 61 into the bottom of the hollow coils at 64 and 65, upward through the coils, into the annular space 68 from the passage 66 and 67 at the top of the coils, through the pressure joint and discharging at the outlet 69; however, it will be apparent that the path of flow may be reversed and passed down through the annular space 68 and coils 37 and 38 and return upward through the annular space 61 and stationary inlet tube 54 exiting at 53.

Figure 3:
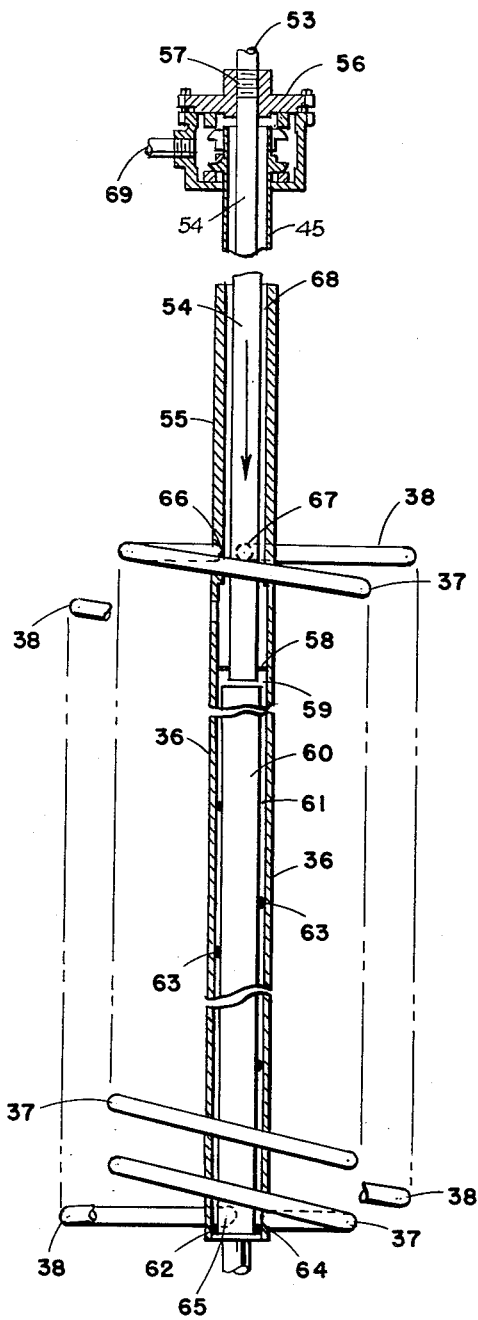
FIG. 3 is a vertical section through the agitator-conveyor illustrating partly schematically the path of flow of the heat exchange fluid through the shaft and coils.
Figure 4:
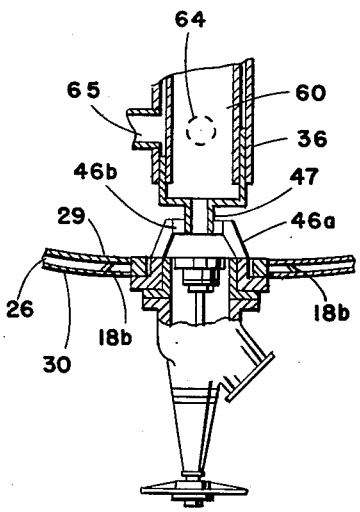
FIG. 4 is a partial sectional view of the lower bearing of the unit.

In the embodiment above described and by reference to FIG. 3, it will be understood that in operation of the reactor, as the shaft 36 is rotated by the driving means, that the shaft extension 45 extending into the rotary pressure joint 57 as well as the entire unit 15 which includes the coils and mixing ribbons rotate, but that the inlet tube 54 and rotary pressure joint housing remain stationary. The polymeric material is aided in its direction of flow by a pressure exerted by suitable pumps rotated at the feed and/or exit lines of the reactor of the present invention.

From the foregoing description, it will be apparent that the apparatus of the present invention provides by way of its novel combination an extremely useful contribution to the art for the reaction and handling on a commercial scale of polymeric compounds which require accurate and intimate control of temperatures. The thorough and rapid mixing action of the mass afforded by the ribbons in combination with the hollow coils and the heat exchange capability of the hollow coils together with the shaft and jacket surfaces provides a superior mechanism for processing polymeric material in a scale not heretofore considered practical.

The following examples are set forth as illustrative and to provide a better understanding of the nature and objects of the invention. All proportions of materials are stated in terms of weight unless otherwise indicated.

*Example 1*

A homopolymer of methyl styrene is prebodied at a temperature of 110° C. until the mass has a viscosity of about 80 poises at 25° C. (a stage wherein the conversion of monomer to polymer is between 30% to 40%) and is fed continuously into the top of the vertical coil reactor of the invention under a feed pump pressure of 50 p.s.i. The temperature is maintained at 190° C.–195° C. throughout reactor. After a retention time in the reactor of 8½ hours, the material is continuously withdrawn at the introductory rate of 1500 pounds per hour. The conversion of the monomer to polymer by analysis is about 65%. The prduct from the reactor is subsequently fed to a devolatilizer-extruder more fully described in the aforementioned pending application, Serial No. 575,164 to remove the unreacted monomer and provide a polymer of greater than 98% purity.

*Example 2*

The procedure of Example 1 is repeated with the exception that two reactors in series are employed. The prebodied methylstyrene containing about 35% polymer is pumped at a rate of 2500 pounds per hour into the first reactor under a pump pressure of 25 p.s.i. and is withdrawn from the top of the first reactor and introduced into the top of the second reactor under a pressure of approximately 55 p.s.i., the retention time in each of the vertical reactors is approximately 4 hours. The first reactor is maintained at a temperature of 180° C. The second at a temperature of 195° C. The polymer content of monomer-polymer may be introduced into the second vertical reactor is approximately 55% by analysis and that withdrawn from the second vertical reactor and fed into the devolatilizer-extruder is approximately 69% polymer. The polymeric material extruded from the devolatilizer-extruder is substantially pure, containing less than 1% of the methanol soluble material.

*Example 3*

The procedure for Example 2 is substantially repeated with the exception that the prebodied feed is a copolymerizable mixture of 29% acrylonitrile and 71% methylstyrene with a conversion to polymer of approximately 30%. The temperature in the first vertical reactor is maintained at 185° C. and that in the second reactor at 195° C. The polymer fed into the devolatilizer-extruder has a polymer content of approximately 67%. The extruded product has a purity better than 99%.

It is apparent and it will be understood that various modifications may be made which fall within the spirit of the invention. The present invention is accordingly not to be limited to the specific embodiment described except as expressed in the appended claims.

I claim:

1. A temperature-controllable polymerization reaction vessel comprising a closed, vertically disposed cylindrical jacket and upper and lower jacketed dome closures for said cylindrical jacket, said jacket and dome closures containing interconnected interior spaces for receiving heat transfer fluid in a continuous spiral path of flow therethrough, a material aperture at each of the opposite longitudinal ends of said jacket, an axially aligned, rotatably mounted heat transfer agitator-conveyor extending substantially the full length of the vessel and removable from the top of said jacket, said agitator-conveyor comprising a hollow central cylindrical shaft, a plurality of helicoidal and concentrically disposed helicoidal mixing ribbons, and a plurality of hollow helicoidal coils defining closed passages for receiving heat transfer fluid in alternate concentric arrangement with said ribbons fixed on said shaft, said shaft and said coils defining a continuous passage for the transmission of heat transfer fluid through said hollow shaft and said hollow coils and means for rotating said agitator-conveyor.

2. The reaction vessel of claim 1 wherein the helicoidal direction of each successive coil and ribbon radiating outwardly from the central shaft is reverse to that of the next successive coil and ribbon respectively.

3. A temperature-controllable polymerization reaction vessel comprising a closed vertically disposed cylindrical jacket and upper and lower jacketed removable dome closures for said cylindrical jacket, said jacket and dome closures containing an interior interconnected space for receiving heat transfer fluid in a continuous spiral path of flow therethrough, a material aperture in each of said dome closures, an agitator-conveyor rotatably mounted in axial alignment in said jacket and removable from the top of said jacket, said agitator-conveyor comprising a hollow central cylindrical shaft, a plurality of helicoidal and concentrically disposed helicoidal mixing ribbons, and two hollow helicoidal coils defining continuous closed passages for receiving heat transfer fluid in alternate concentric arrangement with said ribbons, each of said ribbons and said coils secured in alternate relationship to form a fixed unit with substantially the full length of said cylindrical shaft, the direction of each of said concentrically arranged helicoidal ribbons and coils having a direction reverse to the next successive ribbon and coil respectively, said shaft and said coils defining a continuous passage for the transmission of heat transfer fluid through said hollow shaft and hollow coils and means for rotating said agitator-conveyor.

4. A temperature-controllable polymerization reaction vessel comprising a vertically enclosed cylindrical jacket and upper and lower jacketed removable dome closures for said cylindrical jacket, said jacket and dome closures containing an internal space for receiving heat transfer fluid in a continuous spiral path of flow therethrough, a material aperture in each of said dome closures, a heat transfer agitator-conveyor rotatably mounted in axial alignment in said jacket and removable from the top of said jacket, said agitator-conveyor comprising a hollow central cylindrical shaft, and radiating from substantially the full length of said shaft and forming an integral unit therewith a first mixing ribbon, a hollow coil spaced from, but secured to, said first mixing ribbon, a second mixing ribbon attached directly to said first hollow coil, a second hollow coil positioned concentrically around said second mixing ribbons, two outer mixing ribbons attached directly to said second coil, said ribbons and said coils having a helicoidal arrangement, said hollow central cylindrical shaft and hollow helicoidal coils defining continuous closed passages for receiving heat transfer fluid, the direction of each of the coils respectively and of each of the first and second ribbons respectively being reversed, and means for rotating said agitator-conveyor.

5. The apparatus of claim 4 wherein said first and second mixing ribbons have a pitch of at least twice the pitch of said hollow coils and said two outer mixing ribbons have a pitch of at least four times the pitch of said hollow coils.

References Cited in the file of this patent

UNITED STATES PATENTS

| | | |
|---|---|---|
| 539,055 | Holthaus | May 14, 1895 |
| 1,240,869 | Noble | Sept. 25, 1917 |
| 2,394,291 | Calcott et al. | Feb. 5, 1946 |
| 2,530,409 | Stober et al. | Nov. 21, 1950 |
| 2,540,250 | Feldstein | Feb. 6, 1951 |

FOREIGN PATENTS

| | | |
|---|---|---|
| 65,533 | Switzerland | June 21, 1913 |